United States Patent [19]

Landrigan

[11] 4,430,884
[45] Feb. 14, 1984

[54] METHOD FOR TESTING HYDRAULIC RELEASES

[75] Inventor: George E. Landrigan, Lynnfield, Mass.

[73] Assignee: Landrigan Corporation, Boston, Mass.

[21] Appl. No.: 330,576

[22] Filed: Dec. 14, 1981

[51] Int. Cl.³ .................... G01L 27/00; G01M 19/00
[52] U.S. Cl. .......................................... 73/4 R; 73/37
[58] Field of Search .................................. 73/4 R, 37

[56] References Cited

U.S. PATENT DOCUMENTS

| 2,450,909 | 10/1948 | O'Neil | 73/4 R |
| 4,018,079 | 4/1977 | Landrigan | 73/4 R |
| 4,217,772 | 8/1980 | Katz | 73/4 R |

Primary Examiner—Charles A. Ruehl

[57] ABSTRACT

A method testing a marine hydraulic release of the type used to secure life rafts and the like to ships comprising placing the hydraulic release on a tension stand and applying tension to it to approximate service conditions, characterized in that the method further comprises placing a load cell in direct line with the hydraulic release on the tension stand, the load cell being connected to a tension indicating device, and gradually increasing the tension on the hydraulic release unit by a desired level as determined by the load cell output on the indicating device, thereafter release testing the tensioned hydraulic release unit under superatmospheric air pressure and tension approximating actual service conditions while the hydraulic release and load cell remain undisturbed and under tension. Prior to the application of the air pressure, by monitoring the tension indicating device while the hydraulic release and load cell are under tension, during a period when the adjusting device is not disturbed, a deteriorated condition of the hydraulic release may be detected by gradual decrease of the tension reading, that might not otherwise be detected.

4 Claims, 10 Drawing Figures

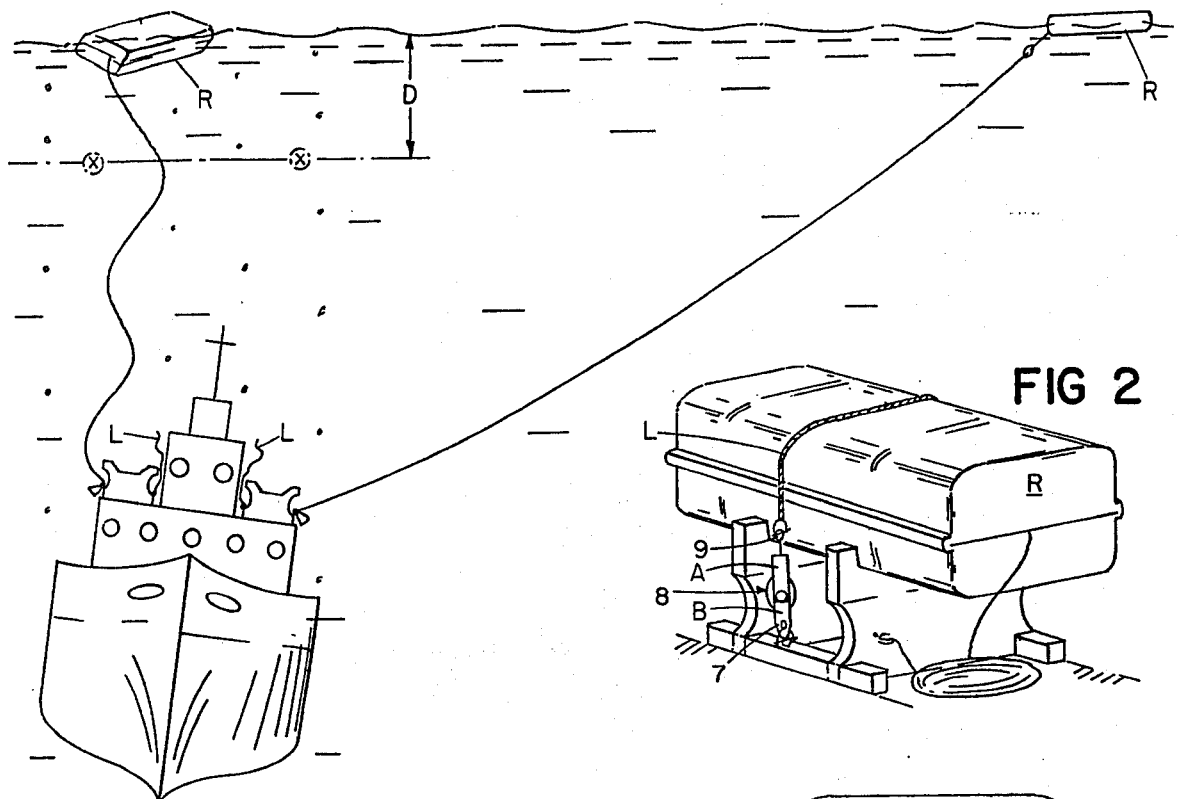
FIG 1
FIG 2
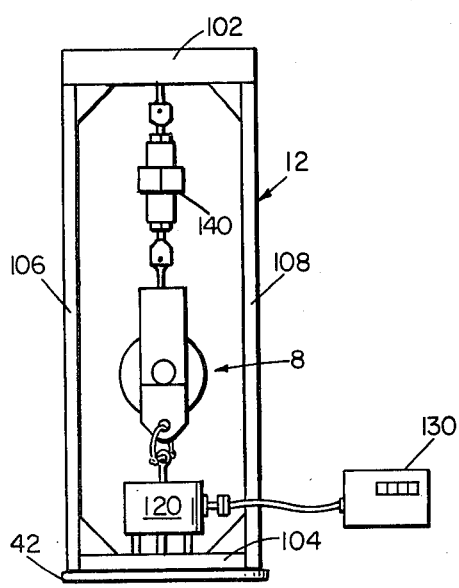
FIG 3
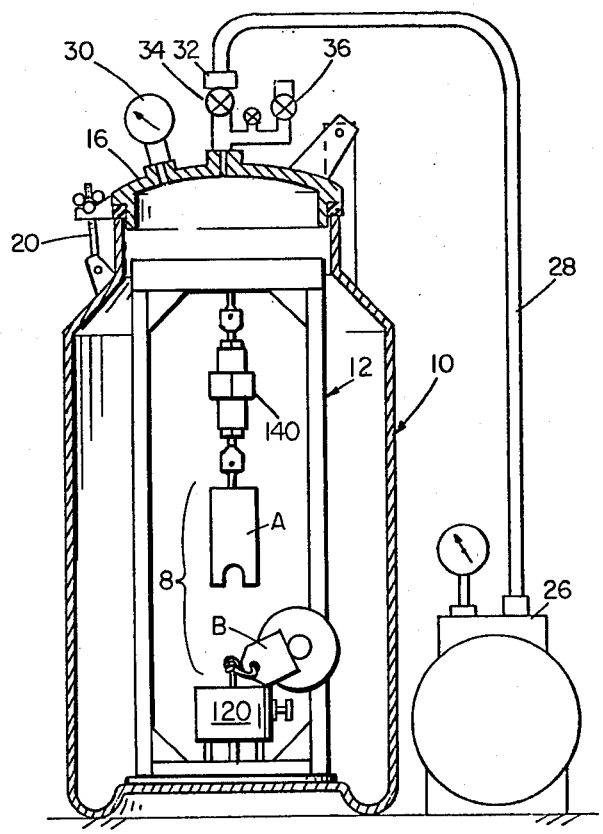
FIG 4

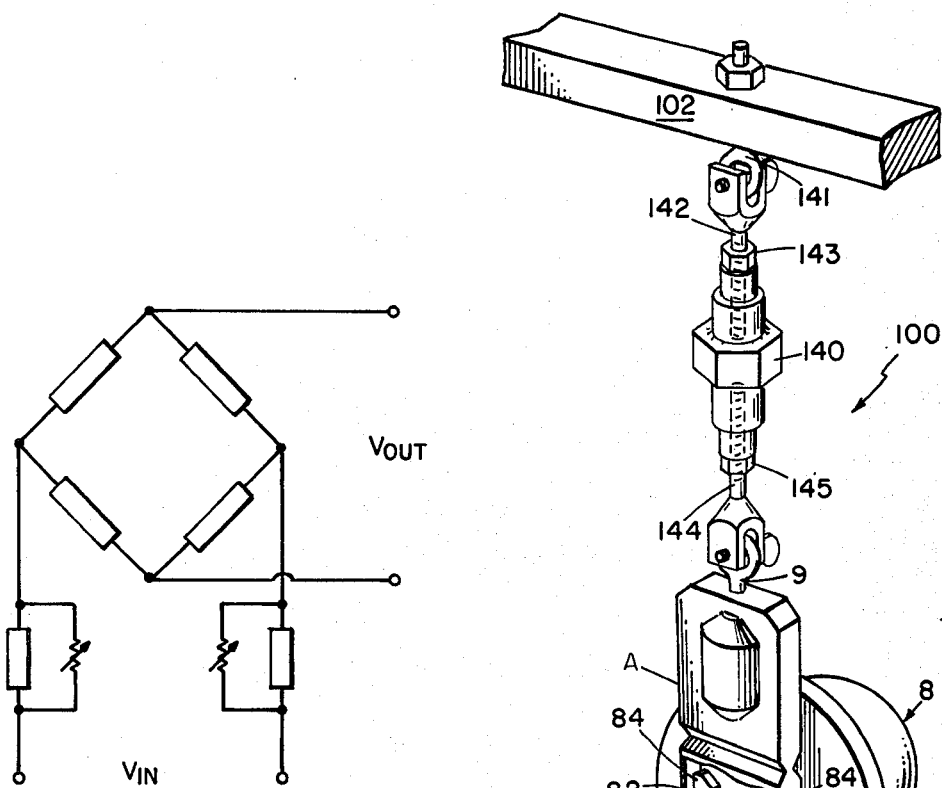
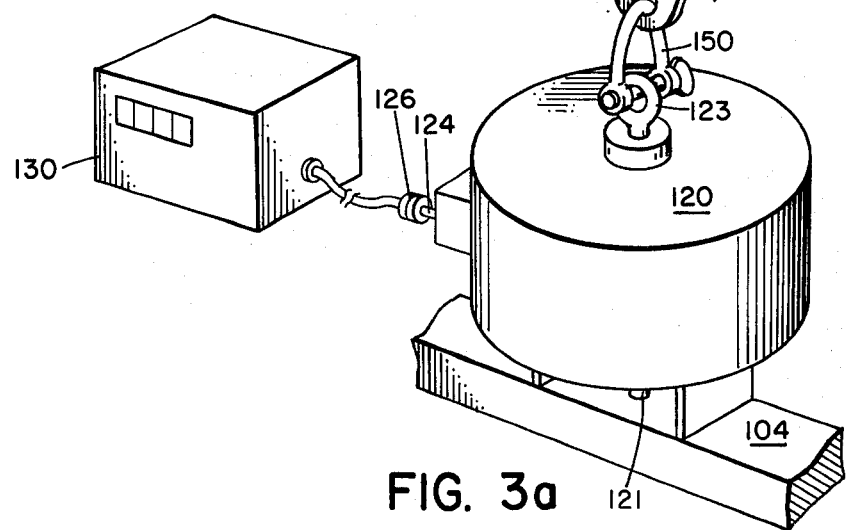
FIG. 3b
FIG. 3a

METHOD FOR TESTING HYDRAULIC RELEASES

FIELD OF INVENTION

This invention relates to testing hydraulic releases of the type used to secure life rafts and the like to ships.

BACKGROUND OF THE INVENTION

Hydraulic releases are employed to secure life rafts and the like to the deck of a ship during normal operation. Should the ship sink and the hydraulic devices thereby be exposed to increased pressure, they are designed to release at preset depths, e.g. between 5 and 25 feet, to allow the buoyant life rafts to return to the surface for the use of survivors.

Government agencies require that the hydraulic releases be periodically tested to ensure proper operation should an emergency arise.

According to prior techniques, hydraulic releases had been tested by submerging them in water which applied hydraulic pressure to the release. The pressure was provided either by a head of water or by use of a pressurized vessel. Such techniques, while accurately testing the operability of the hydraulic release, were objectionable from the point of view of cost and inconvenience of submergence under water and subsequent retrieval from the water.

According to my earlier invention, U.S. Pat. No. 4,018,079, for METHOD AND APPARATUS FOR TESTNG HYDRAULIC RELEASES, this testing may be performed in a superatmospheric pressure vessel using air, instead of water, as the pressure medium, thus to avoid the messiness, time consumption and added cost of water testing, while using a medium of increased permeability to defect emerging problems not readily apparent with water testing.

A further testing service condition requirement imposed by the government agencies is that the release apparatus be tested under a known tension, e.g. 200–3750 pounds, designated to approximate the tension that a hydraulic release would be subjected to should a vessel actually submerge, due, e.g., to the buoyancy of the life raft or other unforeseen stresses accompanying the sinking.

In my earlier invention, this tensioning was determined by the manufacturer's marking (62, FIG. 5) on the shaft (64) connected to the spring (60) of the hydraulic release. In another method shown in Katz, U.S. Pat. No. 4,217,772, the tension is measured by means of a dynamometer which is then isolated from the system and removed before the hydraulic release is placed into the pressure vessel for actual release testing. Neither of these approaches is wholly satisfactory.

It is an objective of my invention to provide an improved apparatus and method for the testing of hydraulic releases.

SUMMARY OF THE INVENTION

The invention relates to a method of testing a marine hydraulic release of the type used to secure life rafts and the like to ships comprising placing the hydraulic release on a tension stand and applying tension to it to approximate service conditions, enclosing the thus tensioned hydraulic release in a superatmospheric pressure vessel, applying compressed air to the interior of the closed vessel in a manner to subject the hydraulic release directly to air under superatmospheric pressure, gradually increasing superatmospheric air pressure simulating corresponding hydraulic pressure related to submergence of the device below the surface of the sea while monitoring an air pressure gauge sensitive to the superatmospheric pressure within the vessel, detecting the instant of release of the hydraulic release in response to the directly contacting superatmospheric air pressure and noting the reading of said air pressure gauge at the time of such release. Only those hydraulic releases which release within a predetermined superatmospheric air pressure range under the applied tension are accepted as having passed the test.

According to the invention the method further comprises placing a load cell in direct line with the hydraulic release on the tension stand in the manner that the load cell is exposed to the same tension that is applied to the hydraulic release, the load cell having an output connected to a tension indicating device, gradually increasing the tension upon the hydraulic release and load cell by use of an adjusting means until a predetermined desired level is reached as determined by the load cell output shown on the indicating device, thereafter placing the tension stand with the tensioned hydraulic release into the superatmospheric pressure vessel and applying the compressed air while the hydraulic release and load cell remain undisturbed on the tension stand under load, and completing the test by increasing the air pressure and detecting the instant of release while the load cell remains in place, in line with the hydraulic release, whereby the hydraulic release can be tested under accurately known tension without risk of loss of tension prior to the test.

In a preferred embodiment the indicating device is adapted to read out change in tension of one or a few pounds, and the test includes monitoring the reading of the tension indicating device over a period, prior to the release, when no change is made to the adjusting means, and rejecting those hydraulic release units which show a decrease in tension in the load cell during the period, this decrease in tension denoting a deteriorated condition of the hydraulic release unit.

In preferred embodiments, the indicating device is connected externally, the steps further comprising disconnecting the indicating device after the desired tension is achieved across the hydraulic release and load cell unit; the tension indicating device is a microprocessor based, digital indicator electrically connected by means provided to the load cell; and the steps further comprise maintaining the tension across the hydraulic release/load cell unit by securably fixing the adjusting means, a turnbuckle adapted for this purpose, against movement before placing the tension stand into the pressure vessel.

These and other objects and features of the invention will be understood from the following description of a preferred embodiment.

PREFERRED EMBODIMENT

The structure and operation of a preferred embodiment of the invention will now be described after first describing the drawings.

Drawings

FIG. 1 depicts a sinking ship from which a life raft has been automatically freed by a hydraulic release;

FIG. 2 depicts a hydraulic release in its tensioned condition, securing a life raft to the deck of a ship;

FIG. 3 depicts a tension stand according to the invention during tensioning of a hydraulic release to be tested;

FIG. 3a depicts on an enlarged scale the tension string shown in FIG. 3, while FIG. 3b is a schematic view of the typical load cell circuitry;

FIG. 4 is a side view of the test appliance into which the tension stand has been inserted, closed and in the condition at the instant of release of the hydraulic release in response to air pressure;

Figure 8:
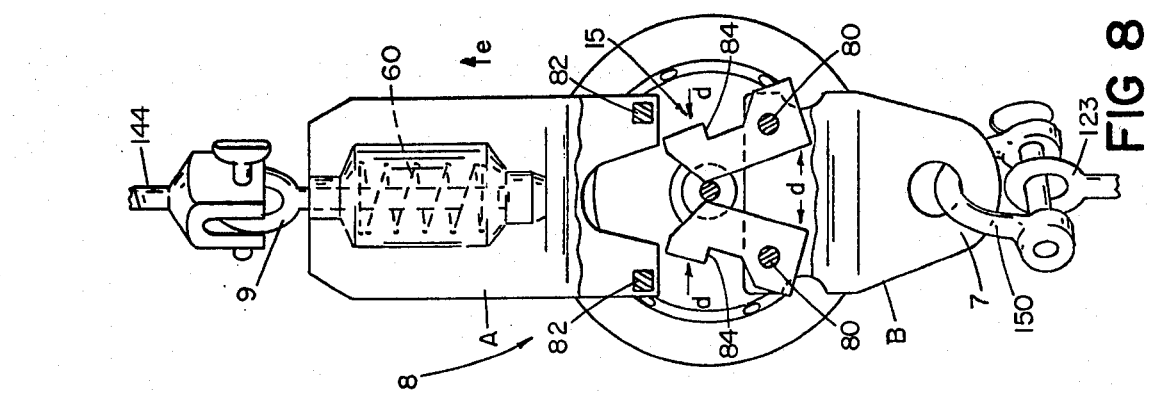
FIGS. 7 and 8 are views similar to FIGS. 5 and 6, respectively, of the hydraulic release at the instant it is released in response to air pressure.

Referring to FIGS. 1 and 2, hydraulic release 8 is secured to a deck pad by means of a shackle through eye 7, and eye 9 is secured to line L under substantial tension for securing life raft R to the deck of the ship. In the event of the ship sinking, when the water pressure at a predetermined depth D, e.g. between 5 and 40 feet, exceeds the pressure setting of hydraulic release 8, hydraulic pressure releases the coupling beween parts A and B, thus releasing line L from the life raft and allowing the life raft to float to the surface where it is inflated and available for survivors.

The hydraulic release 8 is of known construction, descriptions being readily available. A releasing operation of a typical device is shown (FIGS. 5, 6, 7, 8). One part B has a diaphragm 11 exposed to hydraulic pressure (c, FIG. 7) to overcome spring 13, causing a catch arrangement 15 to pivot (d, FIG. 8) at axes 80, thereby releasing rectangular cross members 82 from catch notches 84 and allowing the other part A to be pulled away as a result of the tension (e, FIG. 8) on the assembly.

Referring to FIG. 3, tension stand 12 is comprised of horizontal top and bottom cross members 102, 104, respectively, and vertical support members 106, 108, braced as shown to prevent movement between members while under tension, on circular base 42. The overall height of the stand is of the order of about 26 inches, while the base 42 is of the order of 12 inches in diameter.

The preferred embodiment of the tensioning apparatus 100 is shown in FIG. 3a. The lower horizontal support arm 104 is drilled and threaded to fixably receive threaded lower load button 121 of load cell 120, e.g. of the linear, spring element strain bridge type, e.g. Model BTL FF43 CS5K-C10P1, rated at an output of 3 MV per volt at 5000 lbs., manufactured by Transducers, Inc., of Whitney, Calif., under U.S. Pat. No. 3,228,240, as shown schematically in FIG. 3b. The upper load button consists of eyebolt 123 threaded into the top of load cell 120.

Load cell 120 is electrically connected, via output wire 124 and plug 126 to an external, microprocessor based, digital readout indicator 130, e.g. Doric Model 420 Transducer Indicator, available from Doric Scientific Division, Emerson Electric Co., San Diego, CA., which converts the electrical signal from load cell 120 to a digital readout indicating stress, e.g. in pounds. The system load guaranteed accuracy is 5 pounds or better under full load of 5000 pounds, and has sensitivity to change in load of considerably higher accuracy, i.e. it can accurately show when there has been one or a few pounds change in load.

The top horizontal support member 102 of tension stand 12 is drilled at the center to accommodate eyebolt 141 which in turn supports double shackled turnbuckle 140. Turnbuckle 140 has locking nuts 143, 145 on both shafts 142, 144 to fix the position of the turnbuckle 140 when desired.

Each hydraulic release 8 to be tested is examined to be sure that all working parts are free of grit, soot or other like materials. Hydraulic release 8 is then placed in tension stand 12, the top eyebolt 9, attached to turnbuckle shackle 144, the lower eye 7 connected to the eye bolt load button 123 of load cell 120 by means of shackle 150. Load cell 120 is connected to digital indicator 130 which is activated to indicate the load in pounds. Lock nuts 143, 145 on turnbuckle 140 are loosened and turnbuckle 140 is turned to shorten its overall length. This, in turn, exerts a stress on the train of elements, i.e. turnbuckles 140, hydraulic release 8 and load cell 120 (and the more rigid connecting members) which is indicated by an increased readout on indicator 130. The stress is gradually increased to the desired level, e.g. 3,750 or 5,000 pounds. At this point, lock nuts 143, 145 are tightened onto turnbuckle 140 to prevent inadvertent movement that would change the stress across the hydraulic release 8 and the load cell 120.

The load cell 120 is unplugged from indicator 130 and the entire tension stand 12 (under tension) is placed in pressure vessel (10, FIG. 4) where the hydraulic release is pressure tested according to the following procedure:

A. Place tension stand 12 with mounted hydraulic release 8 and load cell 120, under tension, in the bottom of the tank so that it is positioned vertically.

B. Secure tank top 16 firmly by bolts 20, connect pressure hose 28 to intake manifold quick connect fitting 32, close intake petcock 34 on intake manifold and close decompression valve 36.

Figure 7:
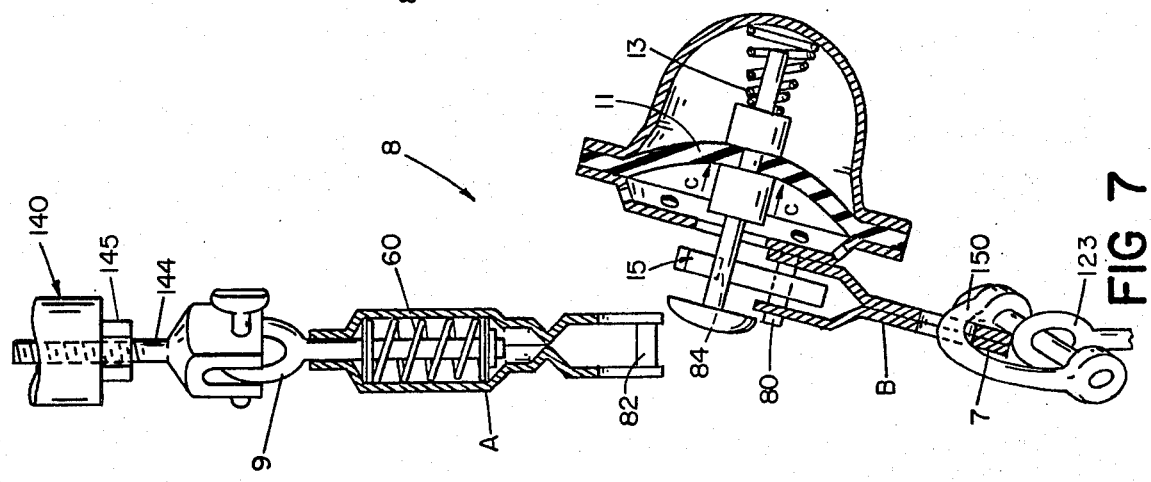
Figure 6:
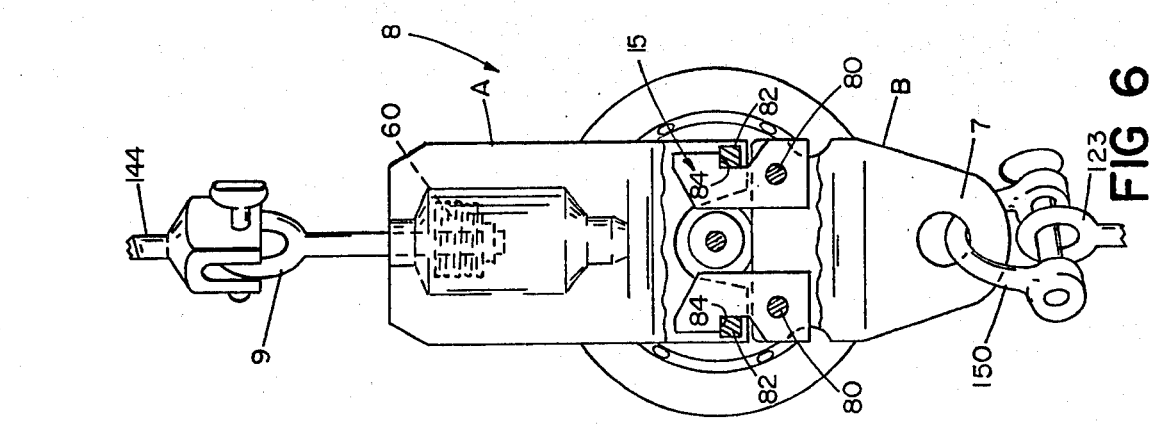
FIG. 6 is a face view of the hydraulic release of FIG. 5.
Figure 5:
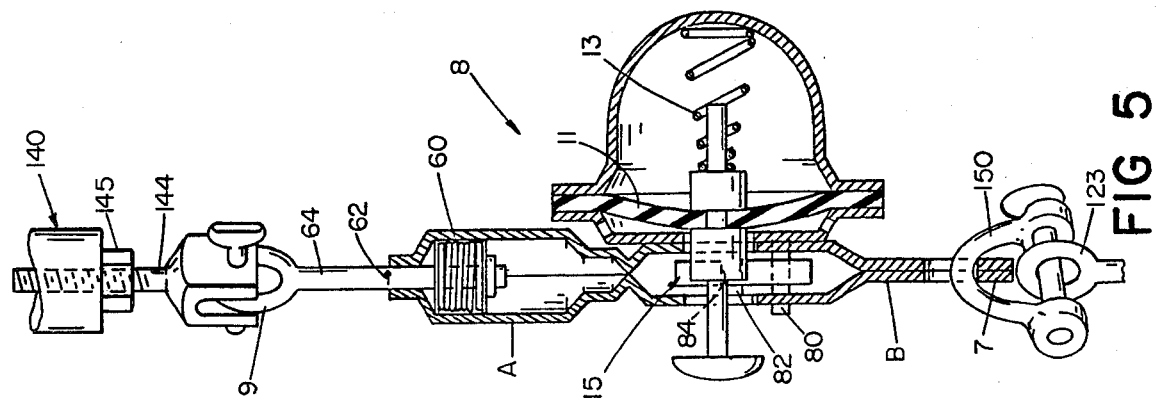
FIG. 5 is a vertical cross-sectional view of the hydraulic release taken on line 5-5 of FIG. 3.

C. Start air compressor 26, open intake petcock 34 and continue to pressurize tank while monitoring the pressure gauge 30 until the hydraulic release 8 parts as shown in FIGS. 4, 7 and 8. This will be indicated by a distinct sound which accompanies release and separation of the hydraulic release 8.

At this moment the operator notes the air pressure at the time of parting and records it.

D. Stop pressurizing tank 10, shut intake petcock 34, open decompression valve 36 and bleed tank of air until pressure gauge reads zero.

E. Release bolts 20, open the tank and retrieve tension stand and separated hydraulic release parts and have the witnessing Inspector (e.g. from U.S. Coast Guard or U.S. Navy) initial and date the record plate attached to the hydraulic release and record the test, with the air pressure as noted.

F. Any hydraulic release parting, e.g. before the air pressure reaches 2.15 psi, which is the equivalent of 5 feet of hydrostatic pressure, or after the air pressure exceeds 10.75 psi, the equivalent of 25 feet of hydrostatic pressure, may be considered as having failed the test and be rejected and withdrawn from services. The particular test specifications can vary depending upon the governmental agency involved and the expected conditions of service. Thus, currently the U.S. Coast Guard specifies that the release operate under pressures within the range that simulates submergence between five and fifteen feet, whereas the U.S. Navy specifies a range between 10 and 40 feet submergence.

After completion of the release test, the tension stand 12 is removed from vessel 10. Hydraulic release 8 is removed and the lock nuts 143, 145 and turnbuckle 140 are loosened to allow testing to begin on the next hydraulic release device.

A further important test procedure can readily be included using the above techniques, taking advantage of the relatively high accuracy of the load cell and its indicating device.

During the initial loading, e.g. at 1000 pound intervals, the operator pauses during his adjustment of the turnbuckle 140. During each pause the operator observes the reading of the indicating device. If, during such pause, the tension reading is observed to decrease, e.g. losing one pound each second or thereabouts, the hydraulic release may be rejected on the basis of a deteriorated condition of the mechanism, e.g. distortion of the spring or pivots, etc., that would prevent maintenance of proper tension.

In the claims, I claim:

1. In a method of testing a marine hydraulic release of the type used to secure life rafts and the like to ships comprising placing the hydraulic release on a tension stand and applying tension to it to approximate service conditions, enclosing the thus tensioned hydraulic release in a superatmospheric pressure vessel, applying compressed air to the interior of the closed vessel in a manner to subject the hydraulic release directly to air under superatmospheric pressure, gradually increasing the superatmospheric air pressure to simulate corresponding hydraulic pressure related to submergence of the device below the surface of the sea while monitoring an air pressure gauge sensitive to the superatmospheric pressure within the vessel, detecting the instant of release of the hydraulic release in response to the directly contacting superatmospheric air pressure and noting the reading of said air pressure gauge at the time of such release, only those hydraulic releases which release in a predetermined superatmospheric air pressure range under the applied tension being accepted, the improvement wherein said method further comprises placing a load cell in direct line with said hydraulic release on said tension stand in the manner that the load cell is exposed to the same tension that is applied to said hydraulic release, said load cell having an output connected to a tension indicating device, said tensioning indicating device being adapted to read out changes in tension of one or a few pounds, gradually increasing the tension upon said hydraulic release and load cell by use of an adjusting means until a predetermined desired level is reached as determined by said load cell output shown on said indicating device, monitoring the reading of said tension indicating device over a period, prior to said release, when no change is made to said adjusting means, and rejecting those hydraulic release units which show a decrease in tension on said load cell during said period, said decrease in tension denoting a deteriorated condition of said hydraulic release unit, placing said tension stand with said tensioned hydraulic release into said superatmospheric pressure vessel and applying said compressed air while said hydraulic release remains tensioned, undisturbed on said tension stand, and completing said test by increasing said air pressure and detecting the instant of release while said load cell remains in place, whereby said hydraulic release can be tested under accurately known tension without risk of loss of tension prior to said test.

2. The method of claim 1 wherein said indicating device is separable from said load cell, said steps further comprising disconnecting said indicating device after the desired tension is achieved across said hydraulic release and load cell, and leaving said indicating device out of said vessel during said test.

3. The method of claim 1 or 2 wherein said steps further comprise securably fixing said adjusting means against accidental movement before placing said tension stand into said pressure vessel.

4. The method of claim 1 wherein said load cell similarly remains undisturbed on said tension stand, and said tension indicating device is connected to said load cell during testing in said vessel, and said test includes continuing to monitor the reading of said tension indicating device while said release is subjected to increasing air pressure in said vessel, and detecting the instant of release by the reading on said indicating device.

* * * * *

UNITED STATES PATENT OFFICE
CERTIFICATE OF CORRECTION

Patent No. 4,430,884                    Dated February 14, 1984

Inventor(s) George E. Landrigan

It is certified that error appears in the above-identified patent and that said Letters Patent are hereby corrected as shown below:

Column 1, line 35, "defect" should be --detect--.

Signed and Sealed this

Twenty-sixth Day of June 1984

[SEAL]

Attest:

GERALD J. MOSSINGHOFF

*Attesting Officer*    *Commissioner of Patents and Trademarks*